United States Patent
Burton et al.

(10) Patent No.: US 6,619,065 B1
(45) Date of Patent: Sep. 16, 2003

(54) HEATING VENTILATING AND AIR CONDITIONING WORKER'S SERVICING CART

(76) Inventors: Bruce H. Burton, P.O. Box 8096, Burlington, VT (US) 05402; William T. Burton, P.O. Box 245, Castleton, VT (US) 05735; Bruce A. Burton, 836 Pencil Mill Rd., Castleton, VT (US) 05735; Jamie A. Burton, 836 Pencil Mill Rd., Castleton, VT (US) 05735

( * ) Notice: Subject to any disclaimer, the term of this patent is extended or adjusted under 35 U.S.C. 154(b) by 0 days.

(21) Appl. No.: 10/284,564

(22) Filed: Nov. 1, 2002

(51) Int. Cl.⁷ .............................. F25B 45/00; B60H 1/32
(52) U.S. Cl. ................. 62/292; 62/239; 62/77; 62/149
(58) Field of Search .................. 62/292, 239, 77, 62/149

(56) References Cited

U.S. PATENT DOCUMENTS

| | | | |
|---|---|---|---|
| 1,831,026 A | 11/1931 | Nessan | |
| 3,232,070 A | 2/1966 | Sparano | |
| 4,413,834 A | 11/1983 | Base | |
| 4,625,949 A | 12/1986 | Walker | |
| 4,669,743 A | 6/1987 | Tipke | |
| 4,688,388 A | * 8/1987 | Lower et al. | 62/126 |
| D292,338 S | 10/1987 | Morrissette | |
| 5,038,578 A | 8/1991 | Manz et al. | |
| 5,282,366 A | 2/1994 | Reilly, Jr. et al. | |
| 5,562,299 A | 10/1996 | Morrissette | |
| 5,570,895 A | 11/1996 | McCue et al. | |
| 6,119,475 A | 9/2000 | Murray et al. | |
| 6,138,462 A | * 10/2000 | Murray et al. | 62/149 |
| 6,173,458 B1 | * 1/2001 | Maddux | 4/626 |
| 6,185,945 B1 | 2/2001 | Pfefferle et al. | |
| 6,202,433 B1 | 3/2001 | Murray et al. | |
| 6,247,325 B1 | 6/2001 | Muston et al. | |
| 6,295,829 B1 | * 10/2001 | Gibot | 62/371 |

* cited by examiner

Primary Examiner—William C. Doerrler
Assistant Examiner—Filip Zec
(74) Attorney, Agent, or Firm—John J. Welch, Jr., Esq.

(57) ABSTRACT

A heating, ventilating and air conditioning worker's servicing cart consisting of a base platform to which is mounted an axle holding two anterior wheels, two posterior platform legs, two pairs of upper platform uprights to the posterior pair of which and the platform legs there are attached handlebars with a top platform attached to the platform uprights and legs with cross braces to which recovery and refrigerant tank strapping is attached with pressurized tank strapping attached to the posterior pair and with brazen rod quivers attached to the posterior platform legs and with a recovery tank stabilizing ring affixed to the base platform as well as a recovery tank stabilizing plate and vacuum pump holding bracket both being affixed to the anterior pair of top platform uprights along with recovery tank support strapping with the plate being affixed below the holding bracket.

6 Claims, 8 Drawing Sheets

HEATING VENTILATING AND AIR CONDITIONING WORKER'S SERVICING CART

CROSS REFERENCES TO PRIOR OR PARENT APPLICATIONS

There are no prior or parent applications to which the instant invention relates.

FEDERALLY SPONSORED RESEARCH AND DEVELOPMENT

The instant invention is not the subject of any federally sponsored research and development.

BACKGROUND OF THE INVENTION

1. Field of the Invention

The instant invention is a device that relates to devices serving to facilitate the servicing, to wit, maintenance and repair of heating, ventilating and air conditioning units.

2. Art Information

The art information statement filed contemporaneously with this application sets forth references which do not however anticipate the instant invention.

A SUMMARY OF THE INVENTION a. A Brief Description of the Invention

The instant invention is a two-wheeled cart device. It has a base platform to which each wheel is anteriorly mounted via axle mounting units affixed to the bottom of the platform. A pair of platform legs each equipped with a hollow foot pad are posteriorly mounted to the base platform. A hollowed out brazing rod quiver is posteriorly affixed to each platform leg. A recovery tank stabilizing ring is mounted to the top surface of the base platform. Two pairs of upper platform uprights are mounted to the base platform. Each pair of top platform uprights and the pair of platform legs are attached to an upper platform. The anteriormost pair of upper platform uprights have attached to a medial side of each below the level of the upper platform, a recovery tank stabilizing plate. Attached to lateral sides of each is recovery tank security strapping. Also attached to each between the bottom of the anteriormost edging of the upper platform and the top side of the recovery tank stabilizing plate is a vacuum pump holding bracket. A first brace attached to a posterior side of each anteriormost upper platform upright and a second brace attached to an anterior side of each of a posteriormost pair of upper platform uprights have affixed to them, ends of refrigerant tanks support strapping. Attached to a lateral side of each posteriormost upper platform upright is pressurized tank support strapping. A handlebar component is attached to a lateral side of each posteriormost upper platform upright as well as to a lateral side of each posterior leg. The base platform serves to carry a reclaimer pump unit so-called in addition to serving to support a recovery tank, digital weight scale and pressurized oxyacetylene tank. A pressurized tank brace and cross rod along with security strapping all affixed to the posteriormost upper platform uprights serve to hold the pressurized oxyacetylene tank in place. The upper platform has a recessed bottom side as well for holding tools and facilitating the performance of work thereupon while minimizing any propensity for spillage.

b. Objects of the Invention

A heating, ventilation and air conditioning unit worker or technician on any ordinary reclamation and system charge undertaking, invariably makes, on the average, some twenty or so backbreaking hand carrying sojourns back and forth from within a building wherein such an undertaking is to occur out to where that person's van would be parked in the street. However, with resort to utilization of the instant invention, such sojourns are reduced in number to two, exclusive of runs back and forth to only carry a ladder. Moreover, the instant invention obviates completely the need to otherwise hand carry heavy tanks that can weigh as much as couple of hundred pounds or more. Such a radical reduction in the number of runs back and forth to a van greatly reduces i.e., by as much as one to two hours the amount of time required to be expended in the performance of such an undertaking. Moreover, obviation of the need for such a person to have to lug such tools and tanks, unit by unit, up and down stairs, around corners and sometimes as much as a few hundred feet, into a building, greatly reduces not only job stress but also the chance that work-related back and/or knee injuries could ensue. This savings in time expended per job as well as unquestionably workers' compensation insurance premiums over time invariably results in enhanced profits to the entrepreneur and likewise reduced costs to customers.

In view of the foregoing, respectfully submitted, the instant invention is indeed new, useful and unique.

A DESCRIPTION OF THE DRAWINGS

A DESCRIPTION OF THE PREFERRED EMBODIMENTS

Figure 1:
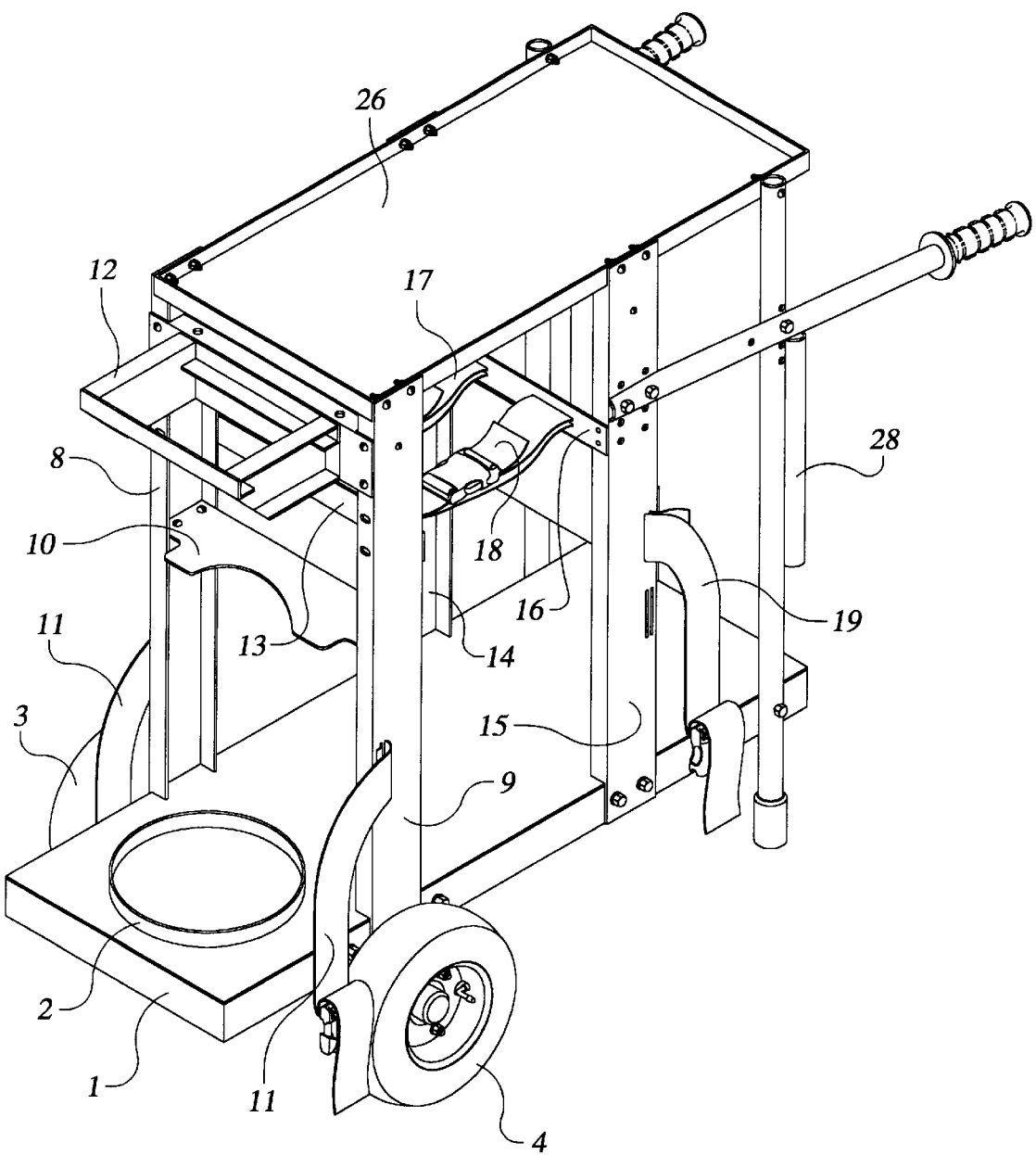
FIG. 1 is a perspective view of the instant invention.
Figure 2:
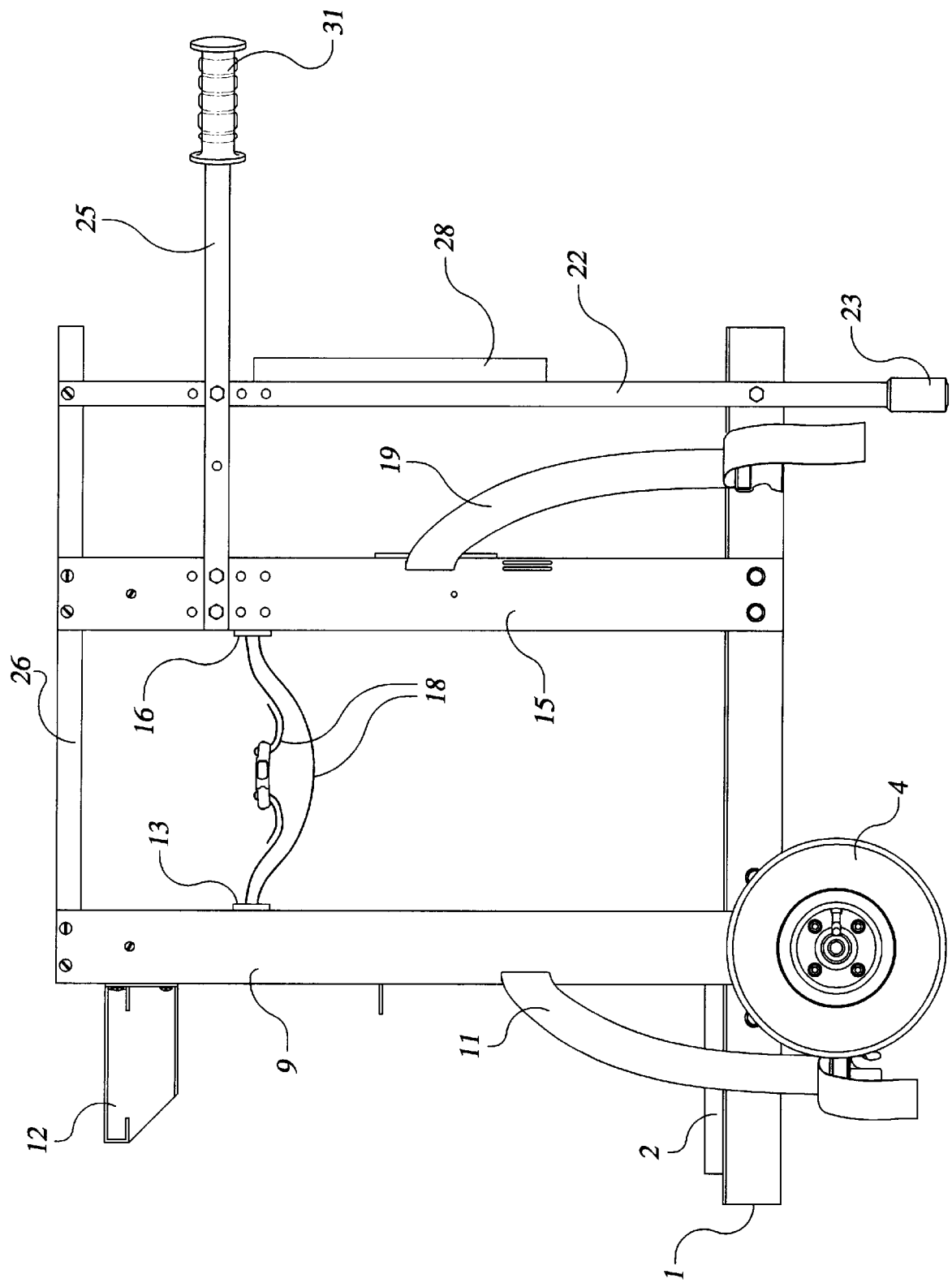
FIG. 2 is a lateral plan view of the instant invention.
Figure 3:
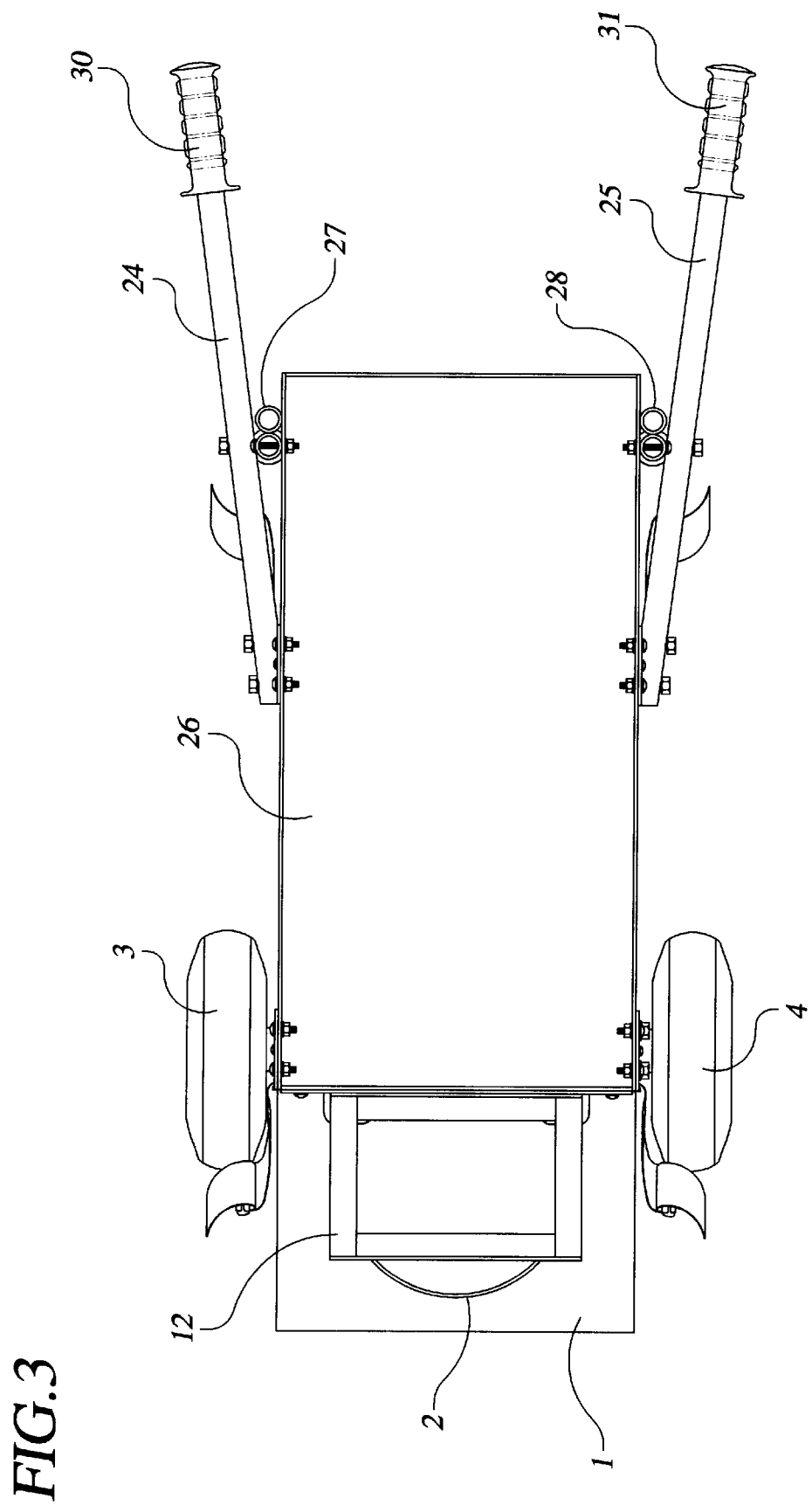
FIG. 3 is a top plan view of the instant invention.
Figure 5:
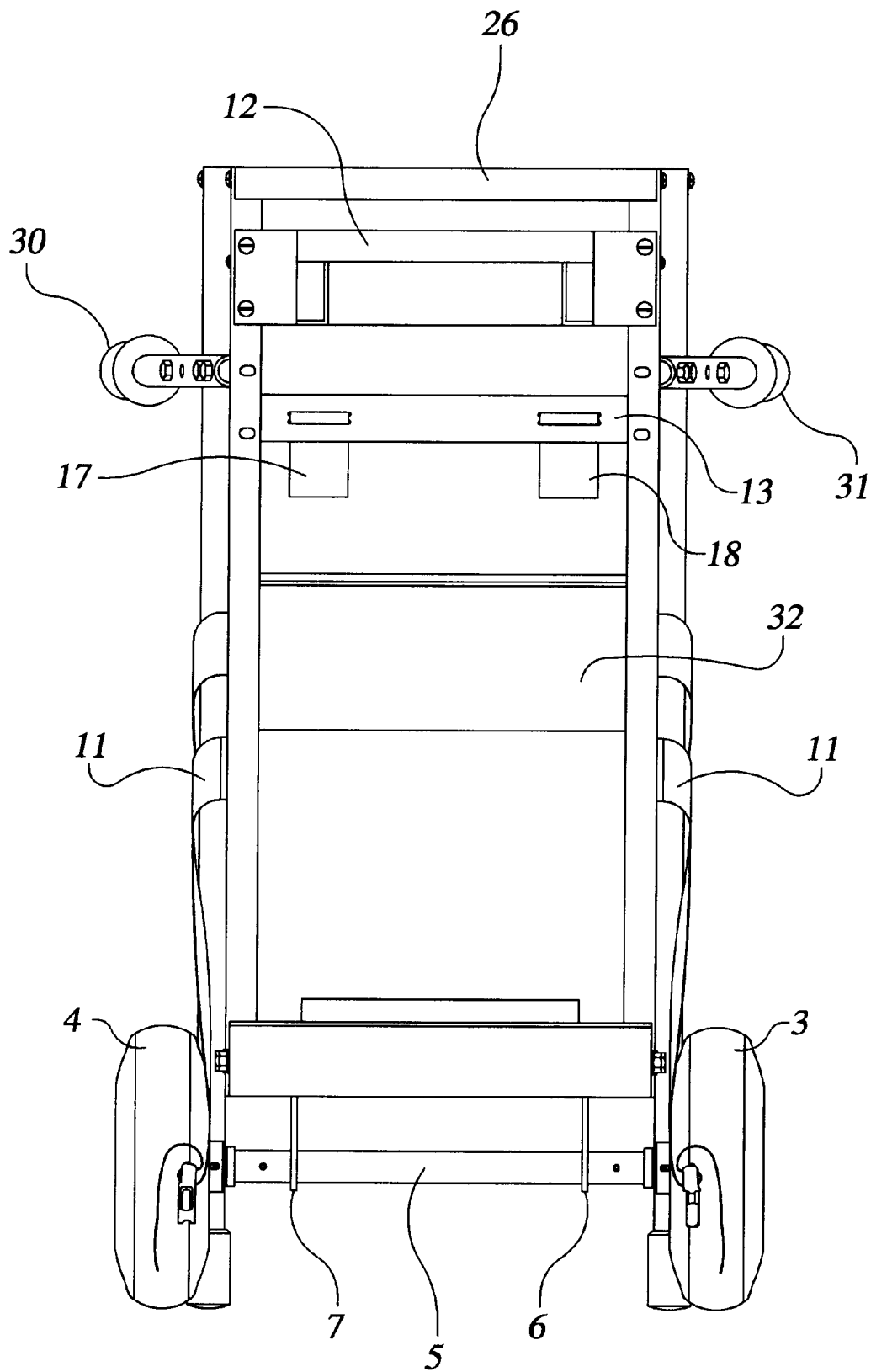
FIG. 5 is a frontal plan view of the instant invention.
Figure 6:
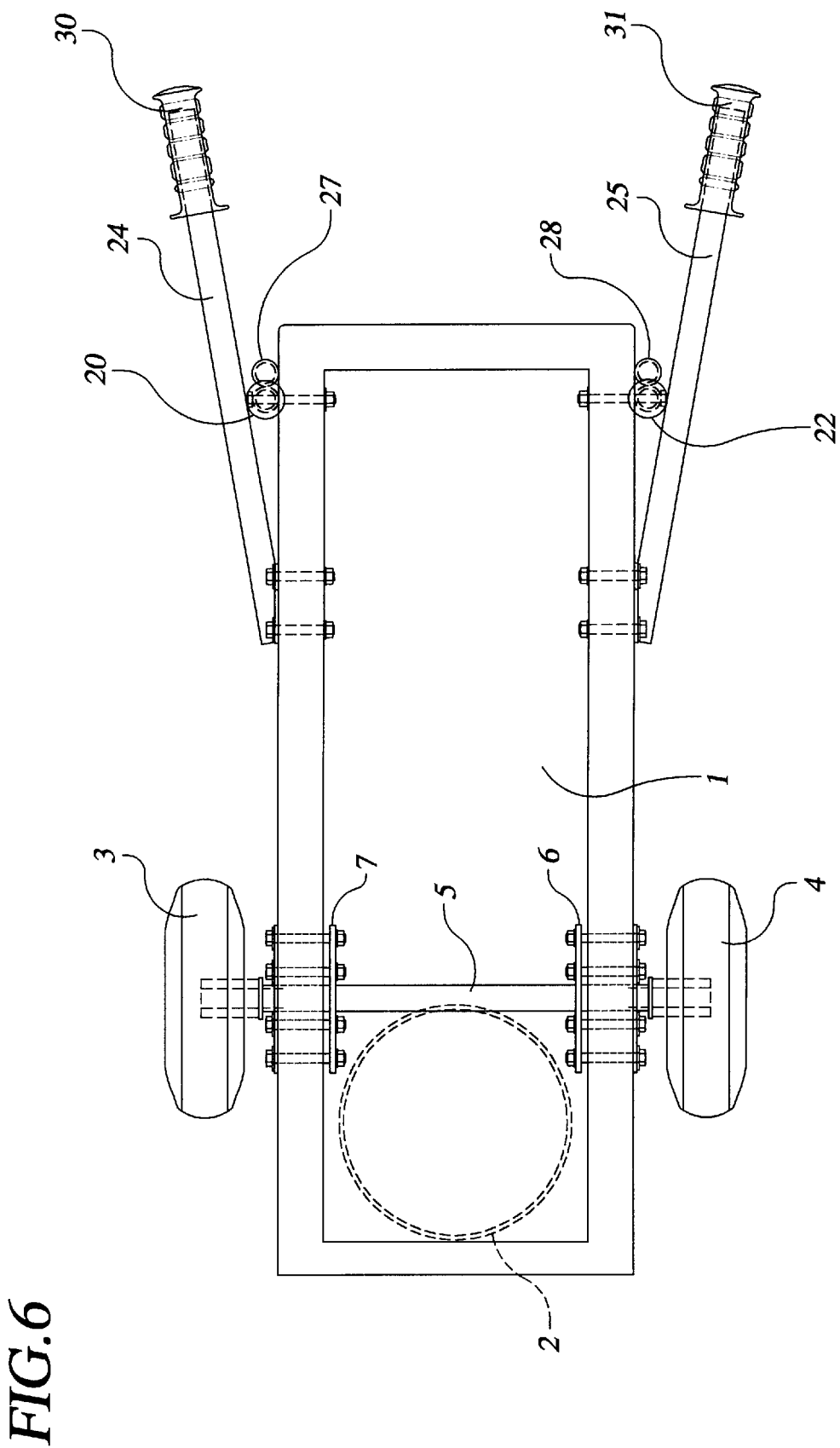
FIG. 6 is a bottom plan view of the instant invention.

FIG. 1 is a perspective view of the instant invention. Therein one notes five sided bottomless base platform 1 to which there is shown affixed thereto recovery tank stabilizing ring 2. First anterior wheel 3 and second anterior wheel 4 are affixed to common wheel axle 5 as can readily be seen with resort to FIGS. 4, 5 and 6. Common wheel axle 5 is affixed to a first lateral side and a second lateral side of base platform 1 by way of a first axle mounting unit 6 and second axle mounting unit 7 as can be seen in FIG. 6. First axle mounting unit 6 is affixed to inner walling of the first lateral side of base platform 1 and second axle mounting unit 7 is affixed to inner walling of the second lateral side of base platform 1. First anteriormost upper platform upright 8 and second anteriormost upper platform upright 9 as seen in FIG. 1 and in FIG. 2 as respects upright 9 both are affixed to and serve to provide support to five sided topless upper platform 26 as seen in FIG. 1. Recovery tank stabilizing plate 10 as seen in FIG. 1 is affixed to inner walling of lateral sides of first anteriormost upper platform upright 8 and second anteriormost upper platform upright 9 below the level whereat vacuum pump holding bracket 12 is affixed to anterior edges of uprights 8 and 9 respectively as seen in FIGS. 1 and 3. Adjustable recovery tank support strapping 11 is affixed to lateral sides of uprights 8 and 9 as seen in FIG. 1. Anteriormost refrigerant tank support strapping brace 13 is posteriorly affixed to uprights 8 and 9 as seen in FIG. 1. First posteriormost upper platform upright 14 and second posteriormost upper 15 both are affixed to and serve to provide support to five sided topless upper platform 26 as do uprights 8 and 9 as seen in FIG. 1. Uprights 8, 9, 14 and 15 are affixed to five sided bottomless base platform 1 as shown in FIG. 1.

Figure 4:
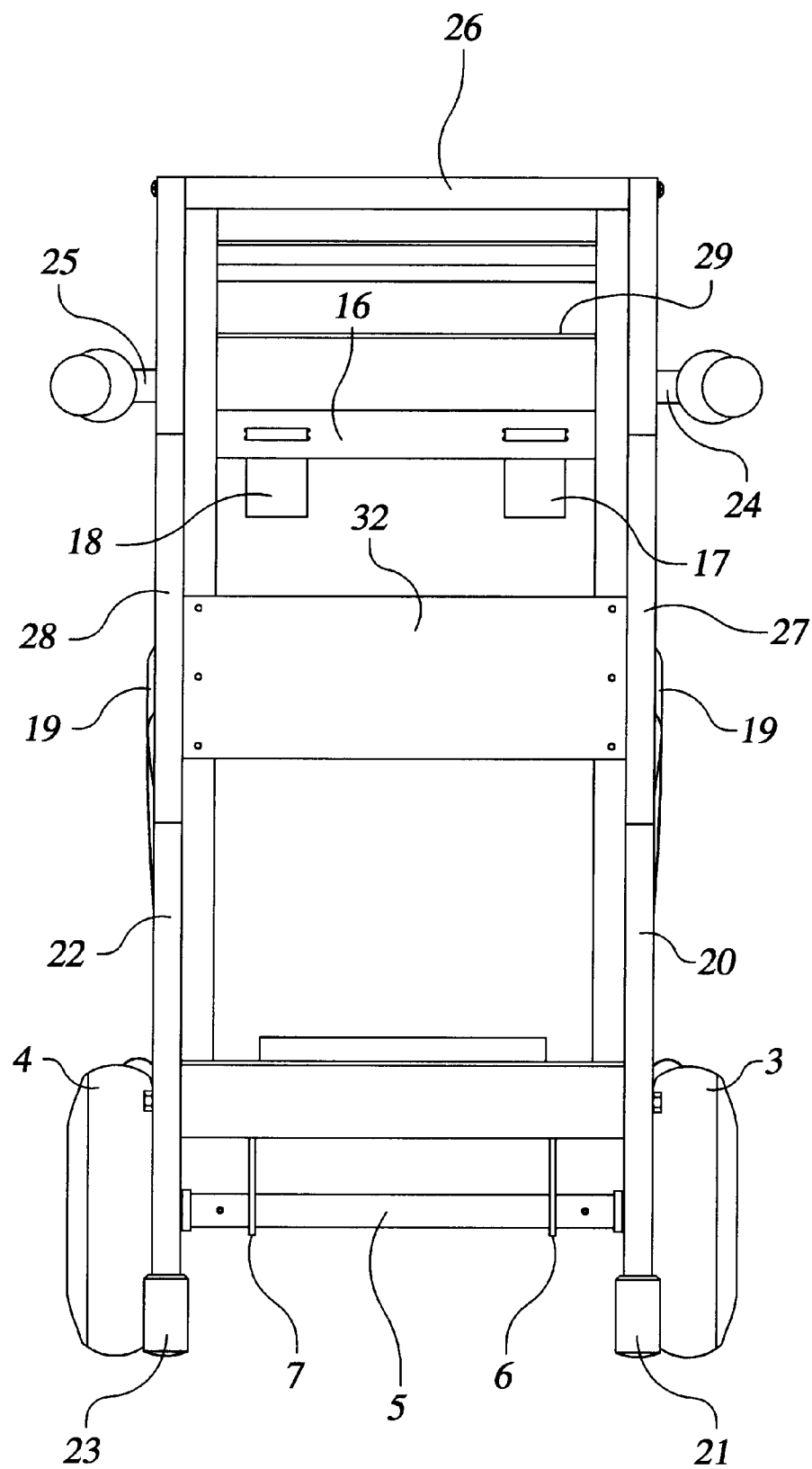
FIG. 4 is a rear plan view of the instant invention.

Posteriormost refrigerant tank support strapping brace 16 is anteriorly affixed to uprights 14 and 15 as seen in FIG. 1. Brace 16 and Brace 13 both serve to hold first refrigerant tank support strapping 17 and second refrigerant tank support strapping 18 as shown in FIGS. 1, 2 and 4. Pressurized tank support strapping 19 is affixed to uprights 14 and 15 as seen in FIGS. 1, 2 and 4. First posterior leg 20 equipped at a bottom end thereof with first hollow rubberized nomar foot pad 21 and second posterior leg 22 equipped at a bottom end thereof with second hollow rubberized nomar foot pad 23 are affixed to platforms 1 and 26 as seen in FIG. 1. First handlebar 24 is affixed respectively to upright 14 and first posterior leg 20 and second handlebar 25 is similarly affixed respectively to upright 15 and second posterior leg 22 as seen in FIGS. 1, 2 and 4. First hollow brazen rod quiver 27 is posteriorly affixed to first posterior leg 20 and second hollow brazen rod quiver 28 is affixed to second posterior leg 22 as seen in FIG. 4. Cross rod 29 is affixed to uprights 14 and 15 as seen in FIG. 4. First grip sleeve 30 is endwise affixed to first handlebar 24 as seen in FIG. 3 and second grip sleeve 31 is endwise affixed to second handlebar 25 as also seen in FIG. 3. Finally, pressurized tank support brace 32 is shown in FIG. 5 affixed to medial walling of lateral sides of uprights 14 and 15.

Figure 7:
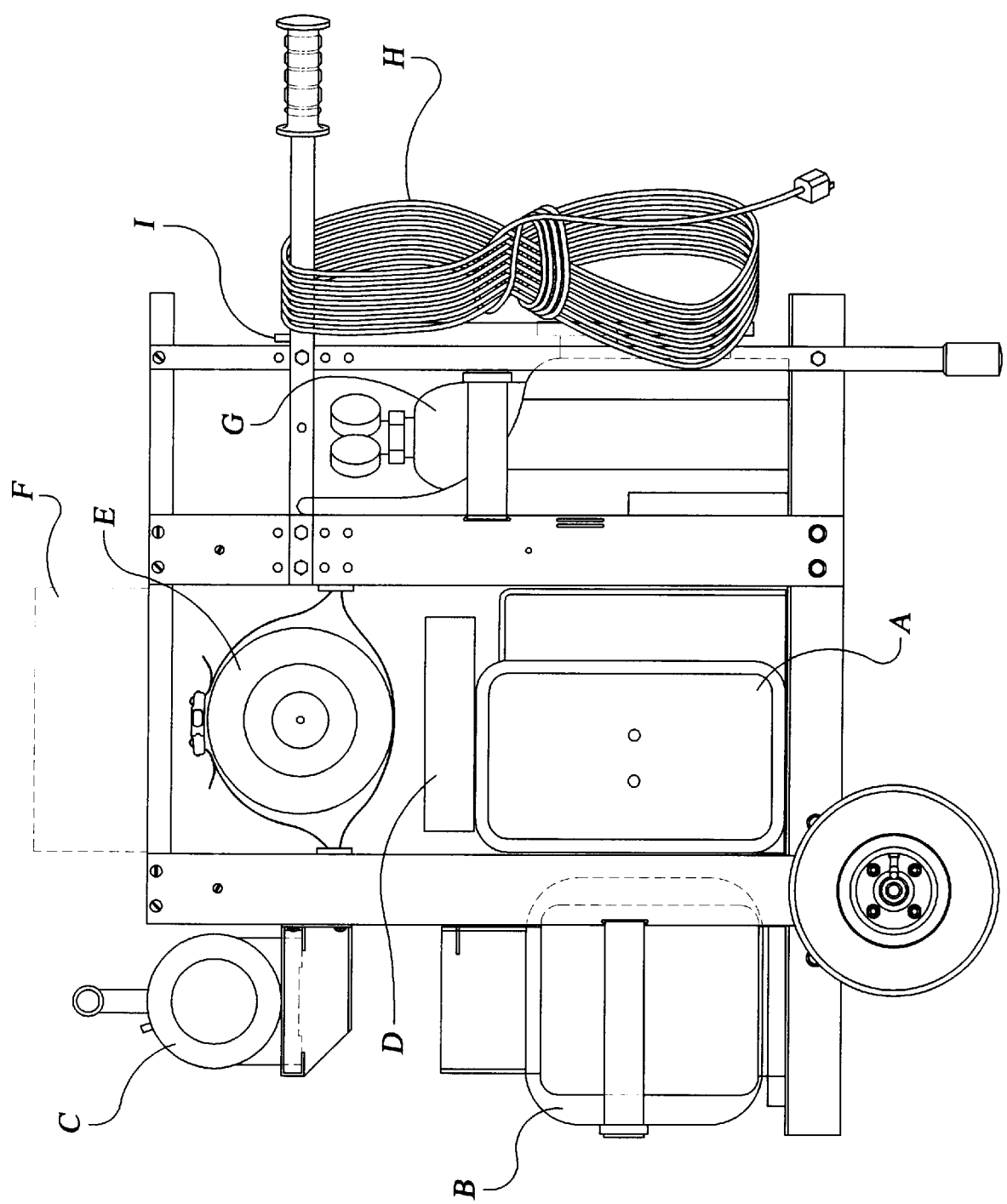
FIG. 7 is a lateral plan view of the instant invention equipped with various tank units and tooling.
Figure 8:
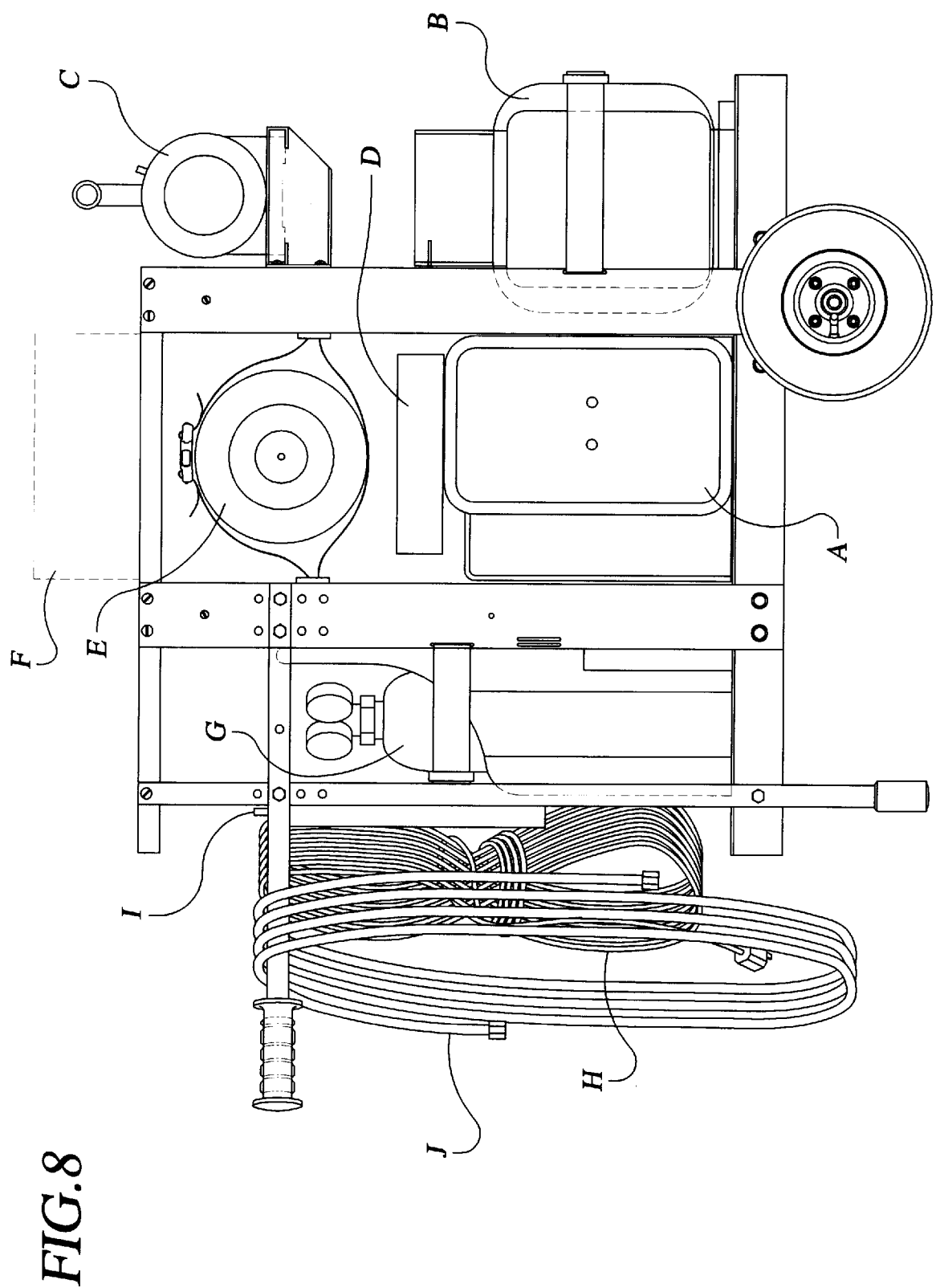
FIG. 8 is a lateral plan view of the instant invention opposite the side thereof shown in FIG. 7.

FIGS. 7 and 8 serve to evidence the remarkable utility of the instant invention. As was earlier noted; heating, ventilating and air conditioning technicians are invariably required to make numerous trips to and from their vans parked in the street and into buildings requiring servicing; carrying heavy tanks, tool boxes, pumps, etc., one item at a time. These multiple trips are, as was likewise previously pointed out, backbreaking and very time consuming. However, as can be noted with resort to FIGS. 7 and 8, all of these backbreaking, time consuming trips back and forth can be wholly avoided and replaced instead with one trip from a van to a job site and one trip back again by way of utilizing the instant invention. A technician removes the instant invention from the back of his or her van. A vacuum pump C is placed within vacuum pump holding bracket 12 and tool box or bag F is placed atop platform 26 recessed as it is, as seen in FIG. 1 to permit work to readily be done upon it with little fear of spillage therefrom. Reclaimer pump tank A is placed atop platform 1 and recovery tank or cylinder B is placed within recovery tank stabilizing ring 2 and up against and within recovery tank stabilizing plate 10 and then secured in place via adjustable recovery tank support strapping 11. Digital weight scale D is then placed upon reclaimer tank A. Refrigerant tank or cylinder E is then secured in place by way of first and second refrigerant tank support strapping 17 and 18. Pressurized oxyacetylene tank G is thereafter positioned atop platform 1 and held in place atop platform 1 by way of pressurized tank support strapping 19 securing tank G firmly against pressurized tank support brace 32 and cross rod 29. Brazing rods 1 are held in brazing rod quivers 27 and 28 and electrical cord H is typically held on one of handlebars 24 or 25. Hosing components J are likewise typically held on the other one of handlebars 24 or 25. The instant invention with all of these items A through J placed aboard it at the locus of the back of the van by the technician is then simply wheeled on wheels 3 and 4 by the technician holding onto sleeves 30 and 31 located on handlebars 24 and 25 to the site within a building where a job is to be done and placed into a position of rest upon legs 20 and 22 respectively equipped with pads 21 and 23. Electrical cord H is plugged into a power outlet so as to ultimately operate i.e., reclaimer tank A or vacuum pump C. Vacuum pump C is then equipped with a piece of hosing J as are refrigerant tank E, reclaimer tank A and recovery cylinder B with resort to the utilization of tools founds in toolbox F. The technician begins by taking i.e., a first piece of hosing J and attaching same at one end thereof to a portal in reclaimer tank A wherein a pump mechanism is located. Then, a second piece of hosing J then attached at one end to recovery cylinder B is then attached at the other end thereof to a second portal in reclaimer tank A. At this juncture, old refrigerant is purged, via the first piece of hosing J attached at the other end thereof to a portion in an air conditioning unit being serviced, out of the air conditioning unit, via the pumping device in reclaimer tank A and the old refrigerant is then diverted therefrom via the second piece of hosing J to recovery tank or cylinder B. Once this is accomplished, then, vacuum pump C is energized and vacuum pump C, via the hosing J, affixed at one end thereof and then affixed at the other end thereof to the portion in the air conditioning unit whereat the first piece of hosing J was previously attached at one end thereof, serves to clean out air and remnant old refrigerant within the lines, as it were, of the air conditioning unit being serviced. Thereafter, cylinder B is weighed by lifting it in place, holding it positioned higher than the level of stabilizing ring 2 by way of loosening then tightening strapping II and then placing scale D below it and upon stabilizing ring 2. Cylinder B is then lowered onto scale D. The weight difference between the known weight of empty cylinder B and the resultant weight thereof when cylinder B is full of old refrigerant enables the operating technician to then determine how much new refrigerant located and stored within refrigerant tank or cylinder E to pump into the air conditioning unit after attaching more hosing J affixed at one end thereof to cylinder E, at the other end thereof to the abovementioned portal in the air conditioning unit. Scale D is then put back where it was originally positioned after having been removed from beneath recovery tank B which is then repositioned within ring 2. Pumping of new refrigerant via a pump system within the air conditioning unit, into the air conditioning unit then occurs. Once the new refrigerant has been accepted by the air conditioning unit, then the servicing of the same is complete and the pieces of hosing J attached to tanks A and B, pump C and tank E are removed therefrom and from the now serviced air conditioner and repositioned on one of handlebars 24 or 25. Power via cording H can be utilized to actuate oxyacetylene tank G so that torching of one of the ends of a brazing rod J can serve to provide a metallic weld for piping or vent pieces sought to be conjoined or repaired within the context of repair of any piping found within the building associated with the heating system or ventilation units found therein near or even perhaps somewhat removed from the site therein where the servicing of the air conditioning unit would have taken place. It's very easy to, if need be, simply wheel the instant invention from the air conditioning servicing site to the site of where there would be piping within the building in need of replacement or repair or where a weld as respects a metallic ventilation component would be needed. Finally, when all of the technician's work is complete, the instant invention with all of the items A through J positioned thereupon, as seen in FIGS. 7 and 8, is simply and readily wheeled out of the building back to his or her equipment van.

In conclusion, respectfully submitted, with an eye towards the foregoing recitations, the instant invention is not merely new, useful and unique but rather instead, it is indeed, veritably revolutionary in respect of advancement of the art of servicing heating, air conditioning and ventilating units.

What is claimed is:

1. A Heating, Ventilating and Air Conditioning Worker's Servicing Cart, comprising:
   a. a five sided bottomless base platform;
   b. a recovery tank stabilizing ring affixed to a top side of said base platform;
   c. a first anterior wheel;
   d. a second anterior wheel;
   e. a common wheel axle;
   f. a first axle mounting unit;
   g. a second axle mounting unit;
   h. said first anterior wheel being affixed at a first end of said common wheel axle;
   i. said second anterior wheel being affixed at a second end of said common wheel axle;
   j. said common wheel axle being held by said first axle mounting unit and said second axle mounting unit;
   k. said first axle mounting unit being affixed to inner walling of a first lateral side of said base platform;
   l. said second axle mounting unit being affixed to inner walling of a second lateral side of said base platform;
   m. a first anteriormost upper platform upright affixed to outer walling of said first lateral side of said base platform;
   n. a second anteriormost upper platform upright affixed to outer walling of said second lateral side of said base platform;
   o. a recovery tank stabilizing plate affixed to inner walling of a lateral side of said first anteriormost upper platform and to inner walling of a lateral side of said second anteriormost upper platform upright;
   p. a vacuum pump holding bracket affixed above said recovery tank stabilizing plate and affixed to said inner walling of said lateral side of said first anteriormost upper platform upright and to said inner walling of said lateral side of said second anteriormost upper platform upright;
   q. adjustable recovery tank support strapping affixed at a first end thereof to said first anteriormost upper platform upright and at a second end thereof to said second anteriormost upper platform upright;
   r. a first posteriormost upper platform upright affixed to said outer walling of said first lateral side of said base platform;
   s. a second posteriormost upper platform upright affixed to said outer walling of said second lateral side of said base platform;
   t. an anteriormost frigerant tank support strapping brace affixed posteriorly to said first anteriormost upper platform upright and to said second anteriormost upper platform upright;
   u. a posteriormost refrigerant tank support strapping brace affixed anteriorly to said first posteriormost upper platform upright and to said second posteriormost upper platform upright;
   v. adjustable first refrigerant tank support strapping looped through a first pair of slits in said anteriormost refrigerant tank support strapping brace and through slits in said posteriormost refrigerant tank support strapping brace;
   w. adjustable second refrigerant tank support strapping looped through a second pair of slits in said anteriormost refrigerant tank support strapping brace and through a second pair of slits in said posteriormost refrigerant tank support strapping brace;
   x. adjustable pressurized tank support strapping affixed at a first end thereof to said first posteriormost upper platform upright and at a second end thereof to said second posteriormost upper platform upright;
   y. a pressurized tank support brace affixed at a first end thereof to medial walling of a lateral side of said first posteriormost upper platform uprights and at a second end thereof to medial walling of a lateral side of said second posteriormost upper platform upright;
   z. a five sided topless upper platform affixed to each of said first and second anteriormost upper platform uprights and each of said first and second posteriormost upper platform uprights;
   aa. a first posterior leg;
   bb. a second posterior leg;
   cc. a first hollow brazen rod quiver affixed to said first posterior leg;
   dd. a second hollow brazen rod quiver affixed to said second posterior leg;
   ee. a first handlebar affixed to said first posteriormost upper platform uprights and said first posterior leg, and;
   ff. a second handlebar affixed to said second posteriormost upper platform upright and said second platform leg.

2. A Heating, Ventilating and Air Conditioning Worker's Servicing Cart, comprising:
   a. a five sided bottomless base platform;
   b. a recovery tank stabilizing ring affixed to a top side of said base platform;
   c. a first anterior wheel;
   d. a second anterior wheel;
   e. a common wheel axle;
   f. a first axle mounting unit;
   g. a second axle mounting unit;
   h. said first anterior wheel being affixed at a first end of said common wheel axle;
   i. said second anterior wheel being affixed at a second end of said common wheel axle;
   j. said common wheel axle being held by said first axle mounting unit and said second axle mounting unit;
   k. said first axle mounting unit being affixed to inner walling of a first lateral side of said base platform;
   l. said second axle mounting unit being affixed to inner walling of a second lateral side of said base platform;
   m. a first anteriormost upper platform upright affixed to outer walling of said first lateral side of said base platform;
   n. a second anteriormost upper platform upright affixed to outer walling of said second lateral side of said base platform;
   o. a recovery tank stabilizing plate affixed to inner walling of a lateral side of said first anteriormost upper platform and to inner walling of a lateral side of said second anteriormost upper platform upright;
   p. a vacuum pump holding bracket affixed above said recovery tank stabilizing plate and affixed to said inner walling of said lateral side of said first anteriormost upper platform upright and to said inner walling of said lateral side of said second anteriormost upper platform upright;

q. adjustable recovery tank support strapping affixed at a first end thereof to said first anteriormost upper platform upright and at a second end thereof to said second anteriormost upper platform upright;

r. a first posteriormost upper platform upright affixed to said outer walling of said first lateral side of said base platform;

s. a second posteriormost upper platform upright affixed to said outer walling of said second lateral side of said base platform;

t. an anteriormost refrigerant tank support strapping brace affixed posteriorly to said first anteriormost upper platform upright and to said second anteriormost upper platform upright;

u. a posteriormost refrigerant tank support strapping brace affixed anteriorly to said first posteriormost upper platform upright and to said second posteriormost upper platform upright;

v. adjustable first refrigerant tank support strapping looped through a first pair of slits in said anteriormost refrigerant tank support strapping brace and through slits in said posteriormost refrigerant tank support strapping brace;

w. adjustable second refrigerant tank support strapping looped through a second pair of slits in said anteriormost refrigerant tank support strapping brace and through a second pair of slits in said posteriormost refrigerant tank support strapping brace;

x. adjustable pressurized tank support strapping affixed at a first end thereof to said first posteriormost upper platform upright and at a second end thereof to said second posteriormost upper platform upright;

y. a pressurized tank support brace affixed at a first end thereof to medial walling of a lateral side of said first posteriormost upper platform uprights and at a second end thereof to medial walling of a lateral side of said second posteriormost upper platform upright;

z. a five sided topless upper platform affixed to each of said first and second anteriormost upper platform uprights and each of said first and second posteriormost upper platform uprights;

aa, a first posterior leg;

bb. a second posterior leg;

cc. a first hollow brazen rod quiver affixed to said first posterior leg;

dd. a second hollow brazen rod quiver affixed to said second posterior leg;

ee. a first handlebar affixed to said first posteriormost upper platform uprights and said first posterior leg;

ff. a second handlebar affixed to said second posteriormost upper platform upright and said second platform leg, and;

gg. a first grip sleeve affixed to an outer end of said first handlebar, and;

hh. a second grip sleeve affixed to an outer end of said first handlebar.

3. A Heating, Ventilating and Air Conditioning Worker's Servicing Cart, comprising:

a. a five sided bottomless base platform;

b. a recovery tank stabilizing ring affixed to a top side of said base platform;

c. a first anterior wheel;

d. a second anterior wheel;

e. a common wheel axle;

f. a first axle mounting unit;

g. a second axle mounting unit;

h. said first anterior wheel being affixed at a first end of said common wheel axle;

i. said second anterior wheel being affixed at a second end of said common wheel axle;

j. said common wheel axle being held by said first axle mounting unit and said second axle mounting unit;

k. said first axle mounting unit being affixed to inner walling of a first lateral side of said base platform;

l. said second axle mounting unit being affixed to inner walling of a second lateral side of said base platform;

m. a first anteriormost upper platform upright affixed to outer walling of said first lateral side of said base platform;

n. a second anteriormost upper platform upright affixed to outer walling of said second lateral side of said base platform;

o. a recovery tank stabilizing plate affixed to inner walling of a lateral side of said first anteriormost upper platform and to inner walling of a lateral side of said second anteriormost upper platform upright;

p. a vacuum pump holding bracket affixed above said recovery tank stabilizing plate and affixed to said inner walling of said lateral side of said first anteriormost upper platform upright and to said inner walling of said lateral side of said second anteriormost upper platform upright;

q. adjustable recovery tank support strapping affixed at a first end thereof to said first anteriormost upper platform upright and at a second end thereof to said second anteriormost upper platform upright;

r. a first posteriormost upper platform upright affixed to said outer walling of said first lateral side of said base platform;

s. a second posteriormost upper platform upright affixed to said outer walling of said second lateral side of said base platform;

t. an anteriormost refrigerant tank support strapping brace affixed posteriorly to said first anteriormost upper platform upright and to said second anteriormost upper platform upright;

u. a posteriormost refrigerant tank support strapping brace affixed anteriorly to said first posteriormost upper platform upright and to said second posteriormost upper platform upright;

v. adjustable first refrigerant tank support strapping looped through a first pair of slits in said anteriormost refrigerant tank support strapping brace and through slits in said posteriormost refrigerant tank support strapping brace;

w. adjustable second refrigerant tank support strapping looped through a second pair of slits in said anteriormost refrigerant tank support strapping brace and through a second pair of slits in said posteriormost refrigerant tank support strapping brace;

x. adjustable pressurized tank support strapping affixed at a first end thereof to said first posteriormost upper platform upright and at a second end thereof to said second posteriormost upper platform upright;

y. a pressurized tank support brace affixed at a first end thereof to medial walling of a lateral side of said first posteriormost upper platform uprights and at a second end thereof to medial walling of a lateral side of said second posteriormost upper platform upright;

z. a five sided topless upper platform affixed to each of said first and second anteriormost upper platform uprights and each of said first and second posteriormost upper platform uprights;

aa. a first posterior leg;

bb. a second posterior leg;

cc. a first hollow brazen rod quiver affixed to said first posterior leg;

dd. a second hollow brazen rod quiver affixed to said second posterior leg;

ee. a first handlebar affixed to said first posteriormost upper platform uprights and said first posterior leg;

ff. a second handlebar affixed to said second posteriormost upper platform upright and said second platform leg, and;

gg. a first grip sleeve affixed to an outer end of said first handlebar, hh. a second grip sleeve affixed to an outer end of said first handlebar, and;

ii. a cross rod affixed above said pressurized tank support brace and at a first end thereof to said medial walling of said lateral side of said first posteriormost upper platform upright and at a second end thereof to said medial walling of said lateral side of said second posteriormost upper platform upright.

4. The heating, ventilating and air conditioning worker's servicing cart of claim 1, whereby a first hollow rubberized nomar foot pad is fitted to a bottom end of said first posterior leg, and, a second hollow rubberized nomar foot pad is fitted to a bottom end of said second posterior leg.

5. The heating, ventilating and air conditioning worker's servicing cart of claim 2, whereby a first hollow rubberized nomar foot pad is fitted to a bottom end of said first posterior leg, and, a second hollow rubberized nomar foot pad is fitted to a bottom end of said second posterior leg.

6. The heating, ventilating and air conditioning worker's servicing cart of claim 3, whereby a first hollow rubberized nomar foot pad is fitted to a bottom end of said first posterior leg, and, a second hollow rubberized nomar foot pad is fitted to a bottom end of said second posterior leg.

\* \* \* \* \*